Figure 1:
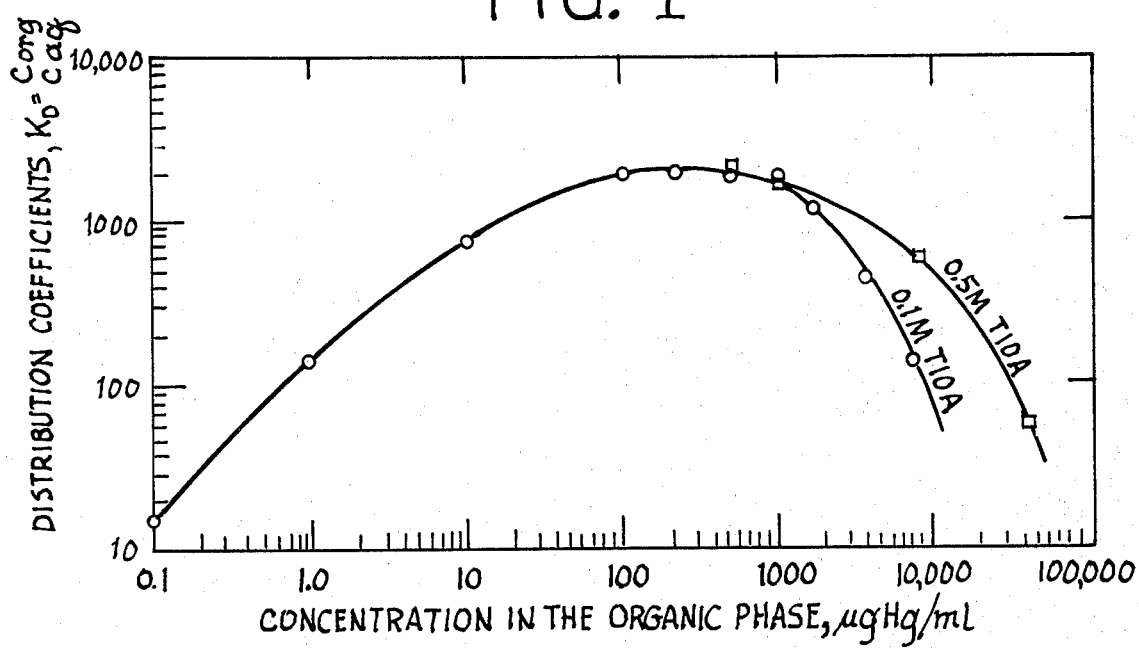

United States Patent [19]

Chapman et al.

[11] 3,899,570
[45] Aug. 12, 1975

[54] EXTRACTION OF MERCURIC CHLORIDE FROM DILUTE SOLUTION AND RECOVERY

[75] Inventors: Thomas W. Chapman, Madison, Wis.; Reinaldo Caban, Rio Piedras, P.R.

[73] Assignee: Wisconsin Alumni Research Foundation, Madison, Wis.

[22] Filed: Feb. 9, 1973

[21] Appl. No.: 331,024

[52] U.S. Cl. ............ 423/100; 423/109; 75/101 BE; 75/121
[51] Int. Cl. ............................................. C01g 13/00
[58] Field of Search ........ 423/100, 109; 75/101 RE, 75/121

[56] References Cited
UNITED STATES PATENTS

| | | | |
|---|---|---|---|
| 3,063,807 | 11/1962 | Kenworthy | 75/101 BE |
| 3,085,859 | 4/1963 | Scholten | 423/100 |
| 3,476,552 | 11/1969 | Parks et al. | 75/121 |
| 3,785,803 | 1/1974 | Moore | 75/101 BE |

OTHER PUBLICATIONS

Coleman et al., "Amine Salts as Solvent Extraction Reagents" from Proc. of 2nd United Nations Conference on Peaceful uses of Atomic Energy, Vol. 28, United Nations Publication, Geneva, 1958, pp. 278–288.

Primary Examiner—Oscar R. Vertiz
Assistant Examiner—Brian E. Hearn

[57] ABSTRACT

The removal and recovery of mercuric materials from dilute solutions by treating mercuric halide in aqueous solution with a solvent solution of a primary, secondary and preferably tertiary alkyl amine having from 6–18 carbon atoms in the alkyl groups, at a pH within the range of 0.5–3 to extract the mercury from the aqueous phase into the organic phase and then extracting the mercuric complex from the organic phase to an aqueous phase by treatment with an aqueous phase at a pH within the range of 9–13.

14 Claims, 3 Drawing Figures

EXTRACTION OF MERCURIC CHLORIDE FROM DILUTE SOLUTION AND RECOVERY

This invention relates to the removal of mercury from systems in which it is present as a contaminant or otherwise in dilute concentrations as mercury or compounds of mercury and it relates also to the removal and recovery of mercury in concentration and purity sufficient for re-use.

It is desirable to have available a process to recover mercury from each of the gaseous, liquid and solid effluents from a mercury cell chlorine plant which, operating in concert, not only accomplish efficient containment of the mercury but also allow economical recycling of the metal without disruption of plant operation. Generally, such processes should avoid introduction of foreign reagents so that additional separation problems are not created.

Satisfactory recovery processes for gaseous and solid effluents do exist in that sodium hypochlorite solutions, formed by dissolving chlorine in alkaline sodium chloride solutions, are effective in absorbing mercury or mercury salts as soluble mercuric chloride. In principle the resulting solutions can be recycled to the brine loop, thus returning the mercury to the electrolysis cell. The difficulty with this scheme is that extensive recycling of liquid streams to the brine system requires that some volume of brine must be purged periodically to maintain steady operation. Purging is also required to prevent accumulation of deleterious impurities in the brine. Therefore, one is still faced with the problem of recovering mercury from liquid effluents, particularly mercuric ions from chloride solutions.

Mercuric ions in chloride solutions exist primarily as the anionic tetrachloride complex. Most of the ion exchange processes which have been suggested for mercury recovery take advantage of this fact. The problem with solid anion exchange resins is that the adsorbed mercury is not easily recovered. Also the resins can be blocked by other ions in the solution or attacked by oxidizing agents such as chlorine.

For both economic and environmental reasons there is a need for a more effective separation process to extract and to recover mercury from dilute solutions. In mercury-cell chlorine plants in particular, one encounters large volumes of effluent and process streams which must be treated for mercury removal. Direct chemical reduction or ion exchange procedures are not entirely satisfactory because they are either expensive, inefficient, or unable to recover the metal values in a convenient manner.

It is an object of this invention to provide a process which takes advantage of the anionic nature of the mercuric complex in solution by solvent extraction of mercuric chloride or other halide by amines in solution and it is a related object to provide a process for the removal of mercuric moieties from dilute solutions and more particularly from aqueous brine solution and for the recovery of the removed mercuric moiety in sufficient concentration for economical use or re-use.

The drawings illustrate the distribution of mercury over various process conditions.

The invention will be described with reference to the following example which is given by way of illustration, and not by way of limitation.

Example 1 of preferred practice of the invention:

Treatment was made of a typical depleted brine from mercury cathode cells in a chlor-alkali plant, having a pH of about 3, a temperature of about 70°C and a mercuric chloride level ranging from 1–50 ppm but averaging about 10 ppm, hereinafter referred to as the aqueous phase.

The aqueous phase was treated with an organic phase in the form of a 0.1M solution of trioctylamine in xylene at 70°C in a multistage countercurrent contacting device having about three theoretical stages. The volumetric ratio of organic phase (O) to aqueous phase (A) was maintained at $O/A = .01$.

Under these conditions, the mercury level in the aqueous phase was reduced to safe levels of under 0.01 $\mu$g/ml, or about 10 ppb, while the resultant organic phase contained mercuric moieties in the amount of about 1,000 $\mu$g Hg/ml.

The solubility of trioctylamine and its salts in water is almost negligible and that of xylene in water is also very small. As a result, the organic phase, containing the extracted mercury as a mercury complex, can be separated from the aqueous phase, from which the mercury moieties have been extracted, simply by decantation.

The loaded amine is stripped of nearly all of its mercury content by the addition of a small volume of brine and sufficient sodium hydroxide to neutralize the HCl in the amine salt and to bring the equilibrium pH to a level of about 11. Under these circumstances the brine (aqueous phase) will extract the mercury from the organic phase and when the ratio of organic phase to aqueous phase is high, the recovered mercury will be present in the aqueous phase in sufficiently high concentration for re-use. For example, when the organic phase, loaded with 1,000 $\mu$g Hg/ml, is treated with a brine having a pH of 11 at an O/A phase ratio of 100, an aqueous phase will be obtained, containing $10^5$ $\mu$g Hg/ml (.5M Hg) in a volume $10^{-4}$ as large as the original treated brine.

Theoretically, the amine extraction, based upon ion pairs, can be represented by the following general equation:

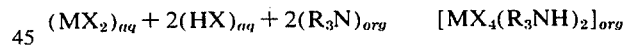

$$(MX_2)_{aq} + 2(HX)_{aq} + 2(R_3N)_{org} \rightleftharpoons [MX_4(R_3NH)_2]_{org}$$

in which M is Hg, X is chlorine or other halogen or $NO_3^-$ or $SO_4^=$ group and R is an alkyl organic group having from 6–18 carbon atoms.

In principle, primary ($RNH_2$), secondary ($R_2NH$), and tertiary ($R_3N$) amines behave similarly. Actually, distribution coefficients for a mercuric chloride usually increase with isomeric form in the order given. The solubility of the amine in water decreases markedly as the number of alkyl (R) groups increases and as the length of these alkyl groups increases. Tertiary amines are insoluble in water for most purposes, but they are miscible with nonpolar solvents, and their capacity for metal extraction increases as chain length increases. When the chain gets too long, however, solutions become viscous, the solubility decreases, and steric hindrance effects become noticeable. Trioctylamine ($C_8H_{17}$)$_3$N possesses an optimum set of properties which make it best suited for practical processes.

Instead of trioctylamine, use can be made of other primary, secondary and preferably tertiary amines in which the carbon lengths of the alkyl groups are within the range of $C_6$–$C_{18}$ for the tertiary amines and preferably within the range of $C_{10}-C_{12}$ while the carbon lengths of the alkyl groups of suitable primary or secondary amines are within the range of $C_8-C_{18}$ and preferably $C_{10}-C_{12}$. Where the alkyl groups of the amines have a carbon length below the limits specified above, the solubility of the amine in the aqueous phase becomes excessive and the amine begins to function as a surfactant. When the carbon length of the alkyl groups exceeds 18, the viscosity of the organic phase becomes too excessive for practical use. The desired results are not secured with substituted amines, unsaturated amines or aromatic amines.

Extraction and recovery, in accordance with the practice of this invention, depends upon the distribution coefficient of the amine. For example, at a pH less than 2 and 0.1M amine, the distribution coefficient is greater than 100 for aqueous mercury concentrations between 0.01 and 100 $\mu$g Hg/ml, reaching a value above 2000 in the intermediate range. At a pH greater than 11, the distribution coefficient is found to be as low as 0.1. The effect of temperature is to diminish the distribution coefficient at elevated temperature somewhat over the entire pH range.

In the practice of this invention, it is desirable to make use of a pH level within the range of 0.5–3 and preferably 1–2 for extraction into the organic phase and a pH above 9 and preferably within the range of 10–13 for recovery of the mercury from the organic phase back into an aqueous phase.

The effect of pH on the equilibrium curves can be explained in terms of the formation of an amine hydrochloride salt which, in turn, bonds with mercuric chloride ion pairs. Similarly, the effect of chloride concentration, which was not studied experimentally, can be predicted. Because the formation constants for the amine hydrochloride and for mercuric chloride complexes are so high, diminished chloride levels should have little effect on the extraction as long as some excess of chloride is present.

Apparently, because of solubility limitations, or possibly because of dimerization, amine concentrations above 0.1M do not enhance the distribution coefficient except, possibly, at high metal loadings where the capacity is increased. Less than .1M can be used, with corresponding decrease in extraction levels, as will hereinafter be pointed out.

The organic solvent in which the amine is dissolved to form the organic phase for extraction of the mercuric moiety from the aqueous phase is not significant. Use can be made of kerosene and the like, preferably in combination with modifiers to prevent formation of a third phase. It is preferred to make use of an aromatic solvent, such as benzene, toluene, naphthalene and the like, with xylene being most widely used.

Further examples which show the effect of pH, amine concentration and temperature on the practice of this invention will hereinafter be given.

Equal volumes of organic phase and a mercury-containing aqueous phase were contacted vigorously in a separatory funnel until equilibrium was reached.

The organic phase contained triisooctylamine (TIOA), 0.1M, dissolved in mixed xylenes (b.p. = 137°–144°C).

The aqueous phase was prepared to contain 4.63 M, or 270 g/l NaCl, which is the typical composition of the depleted brine from the cells in chlor-alkali plants. Original aqueous solutions were prepared to be of known mercury concentration by adding proper volumes of suitable standard mercuric chloride solutions ($HgCl_2$). These concentrations ranged between 0.1 $\mu$g Hg/ml and 10,000 $\mu$g Hg/ml and are expressed as $\mu$g of $Hg°$.

The pH was adjusted with NaOH and HCl, as the case required, in order not to introduce foreign ionic species into the system.

Time required to reach equilibrium was on the order of one to two minutes. A contact time of four minutes was generally used.

After contacting, the phases were allowed to separate (which takes only a fraction of a minute), and the concentrations were measured, as was the equilibrium pH.

Mercury in the aqueous phase was determined by the so-called "Flameless atomic absorption" method which consists of bringing $Hg^{2+}$ from solution into an inert gaseous stream after reduction to $Hg°$ with $SnCl_2$. The air stream is then passed through a cell where optical absorbance at 253.7A is measured. For this purpose a Coleman MAS-50 Mercury Analyzer was used.

The difference between the original mercury content and the measured equilibrium concentration in the aqueous phase was assumed to be the mercury in the organic phase. Successive stripping of the organic phase with 0.1M NaOH (in 4.65M NaCl or by itself) allowed quantitative recovery of the mercury. This procedure was used to determine mercury in the organic phase at high pH where equilibrium mercury concentrations in the amine are very small. Experimental data for the extraction with 0.1M TIOA at pH=1 and 13 were averaged over five to ten points with a relative deviation of at most 5 percent in the analysis.

Experiments were conducted at room temperature (72°F ± 2°F, 22°C) and at 70°C, which is the typical temperature of a depleted brine.

The pH was measured with a Beckman "Electroscan TM 30" and a glass electrode.

Infrared spectra of the organic solutions were taken with a Beckman IR-10 infrared spectrophotometer.

A vapor pressure osmometer, Mechrolab, Inc., Model 301-A, was used for the determination of molecular weights of various species in the organic phase.

The extraction of $HgCl_2$ by TIOA was verified to be highly effective with maximum extraction being achieved around pH=1. Little or no variation with pH was detected between pH = 0.5–2.0 where distribution coefficients ($K_D = C_{org}/C_{aq}$) varied from 14 at a $C_{org}$ of 0.1 $\mu$g Hg/ml to 65 at $C_{org}$ = 10,000 $\mu$g/ml and reached a maximum of 2000 at $C_{org}$ = 500. $K_D$ appears to be above 100 between $C_{org}$ = .8 and $C_{org}$ = 2,300 $\mu$g/ml at 22°C as shown in FIG. 1 for pH = 1. Material balance calculations indicate that at maximum loading the amine to metal ratio in the organic phase is 2:1.

On the basic side, pH = 13, $K_D$ varied from 0.25 at $C_{aq}$ = 0.1 to 0.023 at $C_{aq}$ = 10,000 $\mu$g/ml. (When pH = 1 $C_{org}$ describes better the mercury level because most of the mercury is in the organic phase; the opposite is true at high pH). Little or no effect of pH on the extraction was observed at pH between 11 and 13.

Figure 2:
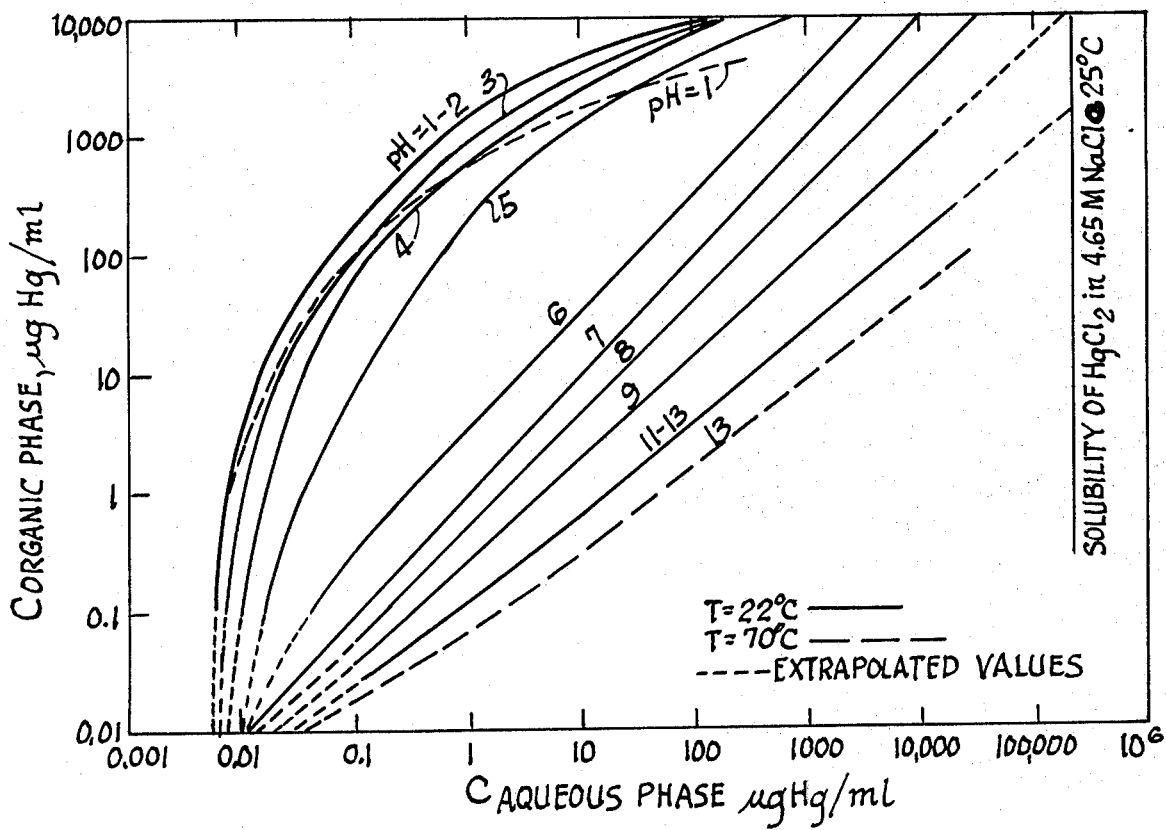

FIG. 2 presents mercury equilibrium curves for 0.1M TIOA over a wide range of mercury concentrations with pH as a parameter. Concentrations are plotted on logarithmic scales, which preserve their relative accuracy. Dashed lines indicate data taken at 70°C.

Equilibrium mercury concentration in the aqueous phase increases with temperature at a given total amount of mercury in the system, the increase with respect to values at 22°C being proportionally higher at higher levels of mercury. This can be attributed, in a qualitative sense, to the higher stability of aqueous mercury chloride complexes at higher temperatures, which can otherwise be observed as an increased solubility. From an operational point of view, the reduction with temperature of the distribution coefficient, $K_D$, being small at expected working levels ($C_{aq} = 0.01$ to 1,000 μg/ml), presents no major problem; at higher pH, the reduction in $K_D$ presents, in any case, an improvement in stripping conditions.

Figure 3:
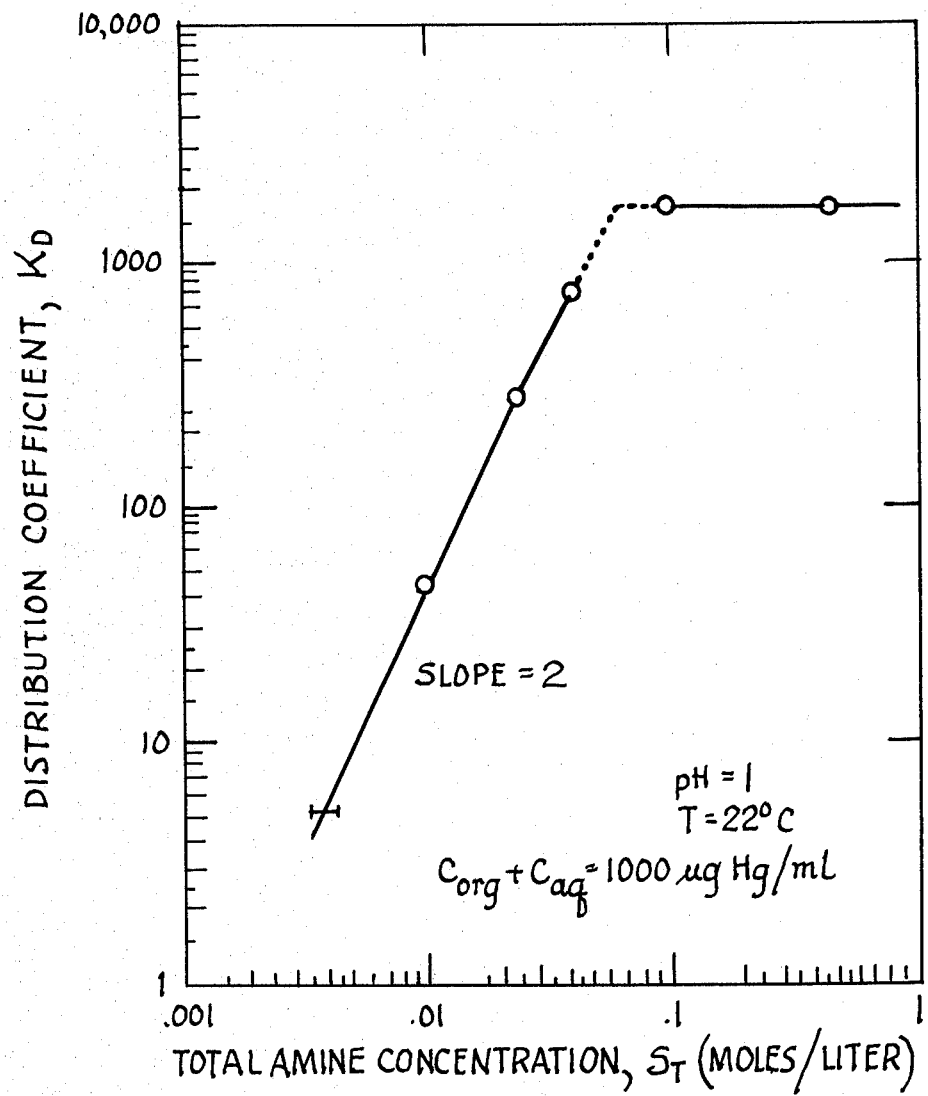

In FIG. 3 the distribution coefficient as a function of total amine concentration is presented for an original aqueous phase mercury concentration of 1,000 μg/ml ($C_{org} + C_{aq} = 500$ μg/ml) at a pH of one. It is seen that the mercury distribution coefficient levels off at a high value for amine concentrations above 0.1M. This same effect is shown in FIG. 1. Except at high aqueous mercury levels, there is no advantage in using an amine concentration higher than 0.1M.

The extraction of mercury with amines, in accordance with the practice of this invention, can also be applied directly to streams where mercury has been oxidized and dissolved with hypochlorite, $O\,Cl^-$, such as those where sodium hypochlorite has been used in the treatment of mercury-containing hydrogen streams and in the treatment of brine sludges in chlor-alkali plants.

An important application of this invention resides in the recovery of mercury by solution mining from cinnabar ores using sodium hypochlorite as the solvent medium for extraction of mercury from the ore. In such systems, the $O\,Cl^-$ is reduced to $Cl^-$ by the half reaction $O\,Cl^- + 2H_2O + 2e^- = Cl^- + 2OH^-$. Hence, after the process of bringing mercury into solution as $Hg^{2+}$ is finished, the system would become similar to the one stutied. The amine extraction functions as a preconcentration and purification of the solubilized mercury to facilitate subsequent recovery of the metal phase. The chloride ion concentration and the pH will be the parameters to be adjusted for optimal operation.

Instead of making use of a hypochlorite solution for dissolving out the mercury from the ore, use can be made of other oxidizing halide solution such as an oxidizing solution of bromine, iodine and the like, or use can be made of an aqueous solution of a halide, such as chloride through which the halogen gas, such as chlorine gas if bubbled, for extraction of mercuric compounds for solution in the aqueous mediu, as the chloride. For a more complete description of the extraction of mercury from the ore by solution in hypochlorite or other oxidizing halide solution, reference can be made to the published article of G. A. Parks and N. A. Fittinghoff, entitled Mercury Extraction Now Possible via Hypochlorite Solution; Eng.-Mining Journal, 107, June 1970, and in U.S. Pat. No. 3,476,552.

Of the metal moieties present in industrial process streams, which may include calcium, magnesium, iron, titanium, aluminum, molybdenum, chromium, vanadium, nickel and manganese, only calcium, magnesium, iron, titanium and aluminum are present in significant amount in addition to mercury, and of these, calcium, magnesium and aluminum are not extractable from the aqueous phase by the amine-organic phase. Since the iron present in the brine is low (2 percent) by comparison to the mercury concentration, it will not interfere with the extraction of mercury, in accordance with the practice of this invention.

From a practical point of view, not only is the extraction equilibrium favorable for a mercury extraction and recovery process, but the extraction is also very fast with phase disengagement presenting no problem. Also the low aqueous solubilities of amine and xylene indicate minimal reagent losses. Oxidizing agents such as free chlorine have no effect on the system, and other extractable ions, such as iron, interfere with the mercury extraction only to the extent of their relative concentration. The organic phase is not consumed so that the only reagent requirements in the process are those for the pH adjustments.

An integrated mercury recycle strategy in a chlorine plant which recaptures mercury from the gaseous and solid effluents requires a process for recovering mercury from subsequent liquid effluents and purge streams. The process of this invention is suitable for that purpose. Such a mercury concentration process may also find use in a hydrometallurgical process for mercury production.

A solvent extraction process of this invention can be applied to depleted brines in chlor-alkali plants and to other chloride streams where mercury exists in the minute concentrations of 10 ti 50 ppm. The mercury content of the treated stream can be lowered to the order of parts per billion in a few equilibrium extraction stages, and, with the proper use of O/A phase ratios, a resulting aqueous phase up to $10^4$ times more concentrated in mercury than the original can be obtained. Such concentrated solutions can be recycled directly or processed further very easily, from both a practical and an economic point of view.

It will be understood that changes may be made in the details of formulation and operation without departing from the spirit of the invention, especially as defined in the following claims.

Abbreviations $C_{aq}$ — concentration of mercury in aqueous phase, μg/ml $C_{org}$ — concentration of mercury in organic phase, μg/ml $K_D$ — Equilibrium distribution coefficient — $C_{org}/C_{aq} = (Hg)_{aq}/(Hg)_{aq}$

We claim:

1. A method for removal and recovery of mercury from dilute solution in aqueous phase in the form of a halide comprising the steps of contacting the aqueous phase with an organic phase formed of a solvent solution of an alkyl amine selected from the group consisting of a primary, secondary and tertiary amine in which alkyl groups are $C_8$ to $C_{18}$ in the primary and secondary amines and $C_6$ to $C_{18}$ in the tertiary amine at a pH within the range of 0.5 to 3.0, separating the aqueous phase and the organic phase containing the mercuric moieties extracted from the aqueous phase, and contacting the separated organic phase with another aqueous phase at a pH above 9 to extract mercuric moieties from the organic phase into the aqueous phase.

2. A method as claimed in claim 1 in which in the first extraction of the aqueous phase with the organic phase, the ratio of organic phase to aqueous phase is less than 1, and in the second extraction, the ratio of aqueous phase to organic phase is greater than 10.

3. A method as claimed in claim 1 in which in the first extraction of the aqueous phase with the organic phase, the ratio of organic phase to aqueous phase is about 0.01, and in the second extraction, the ratio of aqueous phase to organic phase is about 100.

4. A method as claimed in claim 1 in which the alkyl amine is a tertiary amine in which the alkyl groups have from 6 to 18 carbon atoms.

5. A method as claimed in claim 1 in which the alkyl amine is a tertiary amine in which the alkyl groups have from 10 to 12 carbon atoms.

6. A method as claimed in claim 1 in which the alkyl amine is trioctylamine.

7. A method as claimed in claim 1 in which the alkyl amine is a secondary amine, the alkyl groups of which have from 8 to 18 carbon atoms.

8. A method as claimed in claim 1 in which the alkyl amine is present in the organic solvent phase in a concentration up to 0.1M.

9. A method as claimed in claim 1 in which the first extraction is carried out at a pH within the range of 1 to 2 and the second extraction is carried out at a pH within the range of 10 to 13.

10. A method as claimed in claim 1 in which the solvent is an aromatic organic solvent.

11. A method as claimed in claim 1 in which the solvent is selected from the group consisting of kerosene, benzene, xylene, toluene and naphthalene.

12. A method for the extraction and recovery of mercury from its ores the steps of treating the ore with an aqueous oxidizing halide solution for removal of the mercury as the solubilized halide, acidifying the solution to a pH within the range of 0.5–3.0, contacting the acidified aqueous solution with an organic phase formed of an organic solvent solution of an alkyl amine selected from the group consisting of primary, secondary and tertiary amines in which alkyl groups are $C_8$ to $C_{18}$ in the primary and secondary amines and $C_6$ to $C_{18}$ in the tertiary amine, separating the organic phase from the aqueous phase, contacting the organic phase with an aqueous phase at a pH above 9 to extract the soluble mercuric salts from the organic phase at sufficiently high concentration for economic reduction to the metal mercury.

13. The method as claimed in claim 12 in which the oxidizing halide solution is sodium hypochlorite.

14. The method as claimed in claim 12 in which the oxidizing halide solution is an oxidizing chloride solution.

* * * * *

UNITED STATES PATENT OFFICE
CERTIFICATE OF CORRECTION

Patent No. 3,899,570　　　　　　　　　Dated　August 12, 1975

Inventor(s)　Thomas W. Chapman; Reinaldo Caban

It is certified that error appears in the above-identified patent and that said Letters Patent are hereby corrected as shown below:

column 2, line 45, after $2(R_3N)_{org}$, insert $\rightleftarrows$

Signed and Sealed this thirtieth Day of December 1975

[SEAL]

Attest:

RUTH C. MASON　　　　　　　　　C. MARSHALL DANN
*Attesting Officer*　　　　　　　　　*Commissioner of Patents and Trademarks*